(12) United States Patent
Lee et al.

(10) Patent No.: US 7,573,557 B2
(45) Date of Patent: Aug. 11, 2009

(54) LIQUID CRYSTAL DISPLAY DEVICE HAVING PATTERNED SPACERS AND METHOD OF FABRICATING THE SAME

(75) Inventors: Jung-Jae Lee, Gyeonggi (KR); Sam-Yeoul Kim, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/337,671

(22) Filed: Jan. 24, 2006

(65) Prior Publication Data

US 2006/0125980 A1    Jun. 15, 2006

Related U.S. Application Data

(62) Division of application No. 10/706,093, filed on Nov. 13, 2003, now Pat. No. 7,038,747.

(30) Foreign Application Priority Data

Dec. 9, 2002    (KR)    ............... 10-2002-0077948

(51) Int. Cl.
*G02F 1/1339* (2006.01)
(52) U.S. Cl. .................. 349/155; 349/156
(58) Field of Classification Search .......... 349/155–156
See application file for complete search history.

(56) References Cited

U.S. PATENT DOCUMENTS 5,712,065 A    1/1998    Chiang
6,147,729 A    11/2000   Kurauchi et al.
6,323,921 B1   11/2001   Kurauchi et al.
6,392,735 B1   5/2002    Tani
6,426,166 B2*  7/2002    Nishikawa et al. ............. 430/7
6,473,149 B2*  10/2002   Melnik et al. ............... 349/155
6,577,374 B1   6/2003    Nakata et al.
6,781,148 B2*  8/2004    Kubota et al. .................. 257/40
6,798,486 B2*  9/2004    Yanagawa et al. ........... 349/156
6,816,221 B2*  11/2004   Oke et al. .................... 349/141
6,824,935 B2*  11/2004   Tanaka et al. .................. 430/7

FOREIGN PATENT DOCUMENTS

| JP | 07-181316 | 7/1995 |
| JP | 08-095021 | 4/1996 |
| JP | 09-197120 | 7/1997 |
| JP | 09-230124 | 9/1997 |
| JP | 10-221696 | 8/1998 |
| JP | 10-239513 | 9/1998 |
| JP | 11-212076 | 8/1999 |
| JP | 2000-075305 | 3/2000 |

(Continued)

*Primary Examiner*—David Nelms
*Assistant Examiner*—Hoan C Nguyen
(74) *Attorney, Agent, or Firm*—McKenna Long & Aldridge LLP (57) ABSTRACT

A color filter substrate for a liquid crystal display device includes a substrate, a black matrix having a plurality of open portions on the substrate, a color filter layer on the black matrix, and a dielectric layer including first and second layers on the color filter layer, wherein the first layer has a uniform thickness and the second layer has a convex pattern, and the first and second layers include the same material.

7 Claims, 8 Drawing Sheets

FOREIGN PATENT DOCUMENTS

| | | |
|---|---|---|
| JP | 2001-166310 | 6/2001 |
| JP | 2001-305552 | 10/2001 |
| JP | 2002-236210 | 8/2002 |
| JP | 2002-287155 | 10/2002 |
| JP | 2002-350857 | 12/2002 |
| JP | 2002-350867 | 12/2002 |

* cited by examiner

LIQUID CRYSTAL DISPLAY DEVICE HAVING PATTERNED SPACERS AND METHOD OF FABRICATING THE SAME

This application is a Divisional of prior U.S. application Ser. No. 10/706,093, filed Nov. 13, 2003, now U.S. Pat. No. 7,038,747, which claims the benefit of Korean Application No. 10-2002-0077948, filed on Dec. 9, 2002, which are hereby incorporated by reference for all purposes as if fully set forth herein.

BACKGROUND OF THE INVENTION

1. Field of the Invention

The present invention relates to a display device and a method of fabricating a display device, and more particularly, to a liquid crystal display device having patterned spacers and a method of fabricating a liquid crystal display device having patterned spacers.

2. Discussion of the Related Art

In general, a liquid crystal display (LCD) device makes use of optical anisotropy and polarization properties of liquid crystal molecules. The liquid crystal molecules have a definite orientational alignment that results from their long thin shape. The orientation of the liquid crystal molecules can be controlled by application of an electric field to the liquid crystal molecules. Accordingly, as an intensity of the applied electric field changes, the orientation of the liquid crystal molecules also changes. Since incident light through a liquid crystal material is refracted due to an orientation of the liquid crystal molecules resulting from the optical anisotropy of the aligned liquid crystal molecules, an intensity of the incident light can be controlled and images can be displayed.

Among the various types of LCD devices commonly used, active matrix LCD (AM-LCD) devices, in which thin film transistors (TFTs) and pixel electrodes connected to the TFTs are disposed in a matrix configuration, have been developed because of their high resolution and superior display of moving images.

The LCD device includes upper and lower substrates, and a liquid crystal layer interposed therebetween. The upper substrate and lower substrate are commonly referred to as a color filter substrate and an array substrate, respectively. A common electrode and color filter layers are formed on the upper substrate through processes for fabricating a color filter substrate. Similarly, TFTs and pixel electrodes are formed on the lower substrate through processes for fabricating an array substrate.

After the fabricating processes, the LCD device undergoes a liquid crystal cell process where a liquid crystal layer is formed between the upper and lower substrates. The liquid crystal cell process may be divided into a process of forming an alignment layer to align the liquid crystal molecules, a process of forming a cell gap, a process of attaching the color filter and array substrates together, a process of cutting the attached color filter and array substrates into cells, and a process of injecting the liquid crystal molecules. Accordingly, a liquid crystal display panel is fabricating using the liquid crystal cell process.

Figure 1:
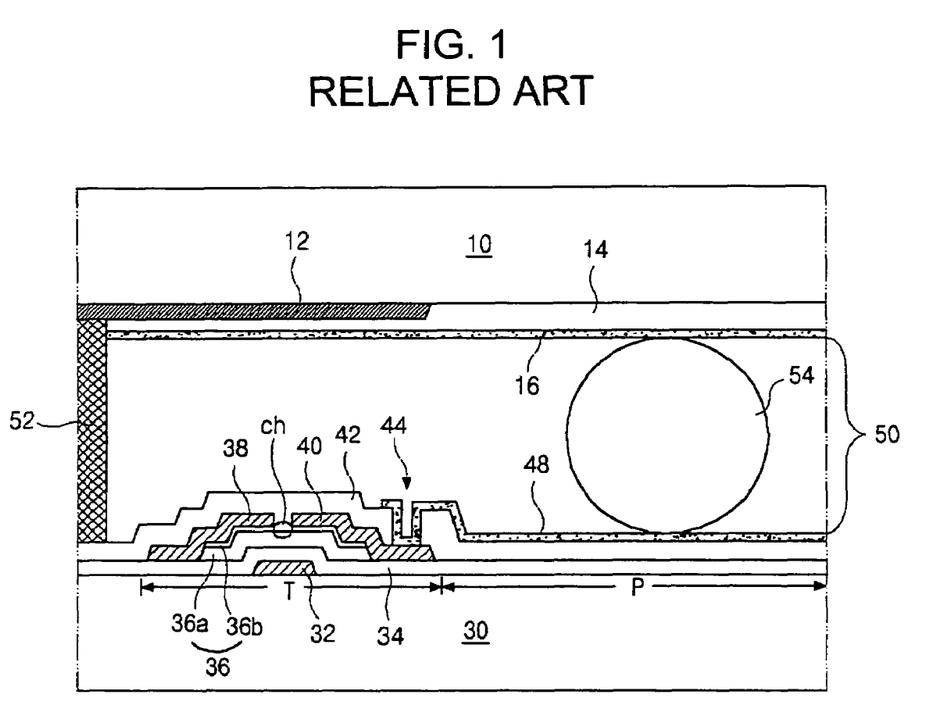
FIG. 1 is a cross sectional view of a liquid crystal display device according to the related art.

FIG. 1 is a cross sectional view of a liquid crystal display device according to the related art. In FIG. 1, upper and lower substrates 10 and 30 are spaced apart from each other, and a liquid crystal-layer 50 is interposed therebetween. A gate electrode 32 is formed on an inner surface of the lower substrate 30, and a gate insulating layer 34 is formed on the gate electrode 32. Then, a semiconductor layer 36, which includes an active layer 36a and an ohmic contact layer 36b, is formed on the gate insulating layer 34 over the gate electrode 32. Next, source and drain electrodes 38 and 40 are formed on the semiconductor layer 36, wherein a portion of the active layer 36a is exposed between the source and drain electrodes 38 and 40 to form a channel region "ch." Accordingly, the gate electrode 32, the semiconductor layer 36, and the source and drain electrodes 38 and 40 constitute a thin film transistor (TFT) "T."

Although not shown in FIG. 1, a gate line connected to the gate electrode 32 is formed along a first direction, and a data line connected to the source electrode 38 is formed along to the second direction perpendicular to the first direction, wherein a plurality of pixel regions "T" are defined by crossings of the gate and data lines. In addition, a passivation layer 42 having a drain contact hole 44 is formed on the TFT "T," and a pixel electrode 48 is formed on the passivation layer 42 within the pixel region "P," wherein the pixel electrode 48 is connected to the drain electrode 40 through the drain contact hole 44.

In FIG. 1, a color filter layer 14 corresponding to the pixel electrode 48 is formed on an inner surface of the upper substrate 10 in order to filter light having specific wavelengths. A black matrix 12 is formed in a boundary region of the color filter layer 14 in order to prevent light leakage and to shield incident light from influencing the TFT "T," and a common electrode 16 is formed on the color filter layer 14 and the black matrix 12. In addition, a liquid crystal layer 50 is formed between the pixel electrode 48 and the common electrode 16, wherein voltage is supplied to the liquid crystal layer 50 through the pixel electrode 48 and the common electrode 16.

In addition, a seal pattern 52 is formed in a periphery of the upper and lower substrates 10 and 30 to prevent leakage of the liquid crystal layer 50. The seal pattern also maintains a uniform cell gap distance between the upper and lower substrates 10 and 30. Ball spacers are 54 disposed between the pixel electrode 48 and the common electrode 16 to maintain the uniform cell gap along with the seal pattern 52. Although not shown, upper and lower alignment layers may be formed on the common electrode 16 and the pixel electrode 48, respectively, to align the liquid crystal molecules.

Since the liquid crystal layer 50 is driven by a vertical electric field generated between the common electrode 16 and the pixel electrode 48, the LCD device has superior transmittance and a high aperture ratio. However, since the vertical electric field makes the substrate and aligns a long axis of the liquid crystal molecule perpendicular to the upper and lower substrates 10 and 30, the LCD device has a narrow viewing angle.

Figure 2:
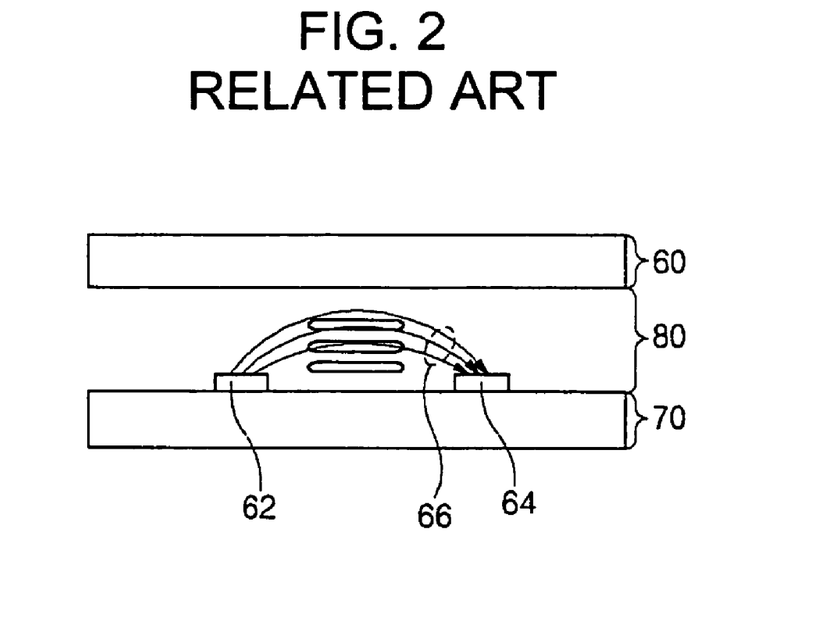
FIG. 2 is a cross sectional view of an In-Plane Switching-mode liquid crystal display device according to the related art.

FIG. 2 is a cross sectional view of an In-Plane Switching-mode liquid crystal display device according to the related art. In FIG. 2, upper and lower substrates 60 and 70 are spaced apart from each other, and a liquid crystal layer 80 is interposed therebetween. Since both a common electrode 62 and a pixel electrode 64 are formed on an inner surface of the lower substrate 70, the liquid crystal layer 80 is driven by a horizontal electric field generated between the common electrode 62 and the pixel electrode 64. Accordingly, a long axis of liquid crystal molecules of the liquid crystal layer 80 is aligned parallel to the lower substrate 70. For example, since the liquid crystal molecules are arranged by a horizontal electric field, displayed images may be viewed at a viewing angle between about 80° and about 85°. Thus, the IPS-mode LCD device has a wider viewing angle than the LCD device using a vertical electric field to align the liquid crystal molecules.

In the IPS-mode LCD device, since both of the common electrode 62 and the pixel electrode 64 are formed on the lower substrate 70, an additional electrode on the upper substrate 60 may be omitted. Accordingly, a top layer may be formed over the inner surface of the upper substrate 60 to provide a high step difference. Thus, an overcoat layer (not shown) may be formed to improve planarization properties of the color filter substrate and patterned spacers or column spacers may be formed on the overcoat layer. The patterned spacers are formed using a photoresist (PR) of a photosensitive organic material using photolithographic processes, which include exposure and development steps.

In FIG. 1, the ball spacer 54 may be made of an elastic material deformable to applied external pressure, such as glass fiber or an organic material. However, since the ball spacers 54 are randomly distributed between the upper and lower substrates 10 and 30, an inferior alignment layer may be formed due to movement of the ball spacers 54. In addition, light leakage may occur within regions adjacent to the ball spacers 54 due to an adsorption force between the liquid crystal molecules adjacent to the ball spacers 54, and a uniform cell gap may not be obtained in a large-sized LCD device. Furthermore, since the ball spacers 54 are elastic and do not remain at a fixed position, a severe ripple phenomenon may occur when the LCD device is touched. Thus, superior display quality can not be obtained in the LCD device using the ball spacers 54 to maintain a uniform cell gap.

On the other hand, a uniform cell gap may be easily obtained using the patterned spacers since they are formed in a non-pixel region, thereby preventing light leakage and improving contrast ratio. In addition, the patterned spacers may be applied to an LCD device requiring a small cell gap due to precise control of the cell gap. Furthermore, since the patterned spacers are fixed, they may be easily applied to large-sized LCD devices and the ripple phenomenon may be prevented when the LCD device is touched. Since the patterned spacers may be formed directly on the overcoat layer in an IPS-mode LCD device, reliability of the patterned spacers is improved.

Figure 3A:
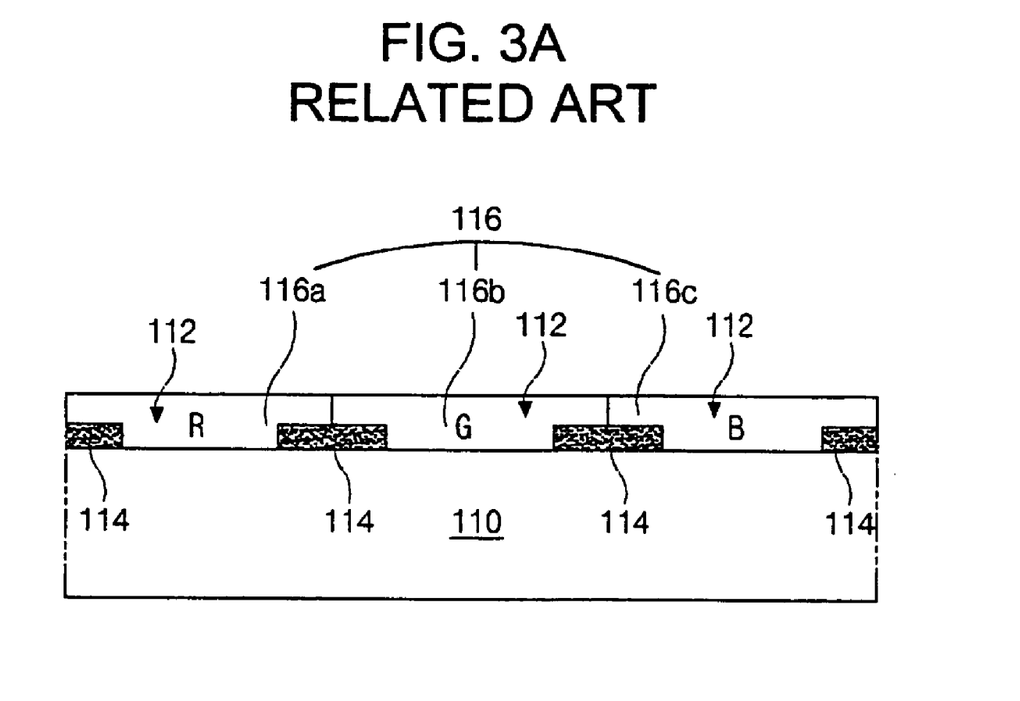
FIGS. 3A to 3D are cross sectional views of a process for fabricating a color filter substrate of a liquid crystal display device according to the related art.

FIGS. 3A to 3D are cross sectional views of a process for fabricating a color filter substrate of a liquid crystal display device according to the related art. In FIG. 3A, a black matrix 114 having an open portion 112 is formed on a substrate 110, and a color filter layer 116, which includes red, green, and blue sub-color filters 116a, 116b, and 116c, is formed on the black matrix 114. The color filter layer 116 may be formed using photolithographic processes that include a negative-type color pigment, wherein a portion of the negative-type color pigment is exposed through a mask and remains as a pattern after a development step. Although not shown, the black matrix 114 is disposed in a periphery of each sub-color filter as a single body.

Figure 3B:
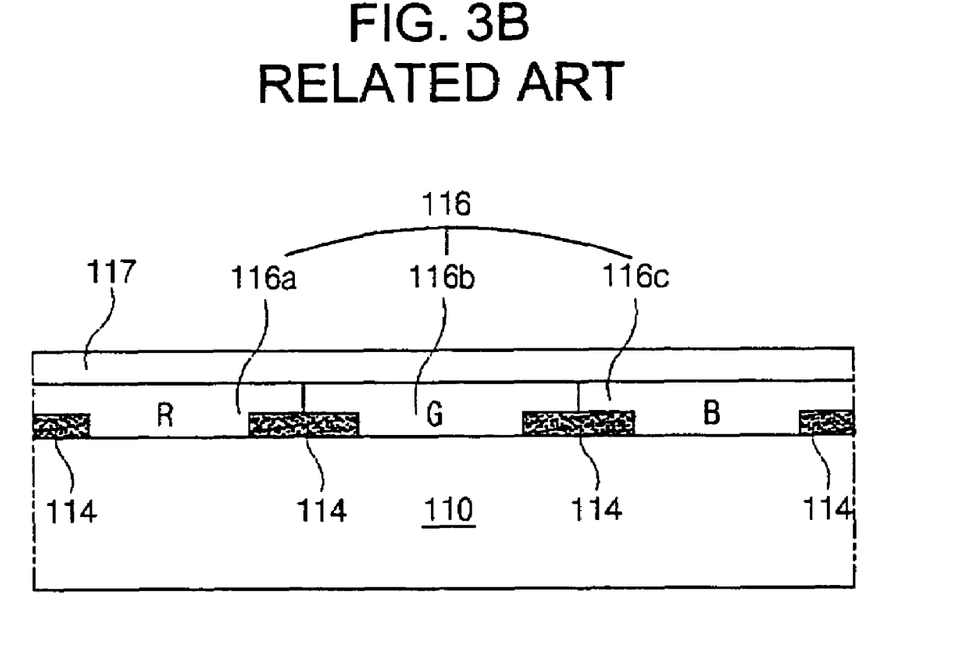

In FIG. 3B, an overcoat layer 117, such as an organic material having excellent planarization properties, is formed on the color filter layer 116.

Figure 3C:
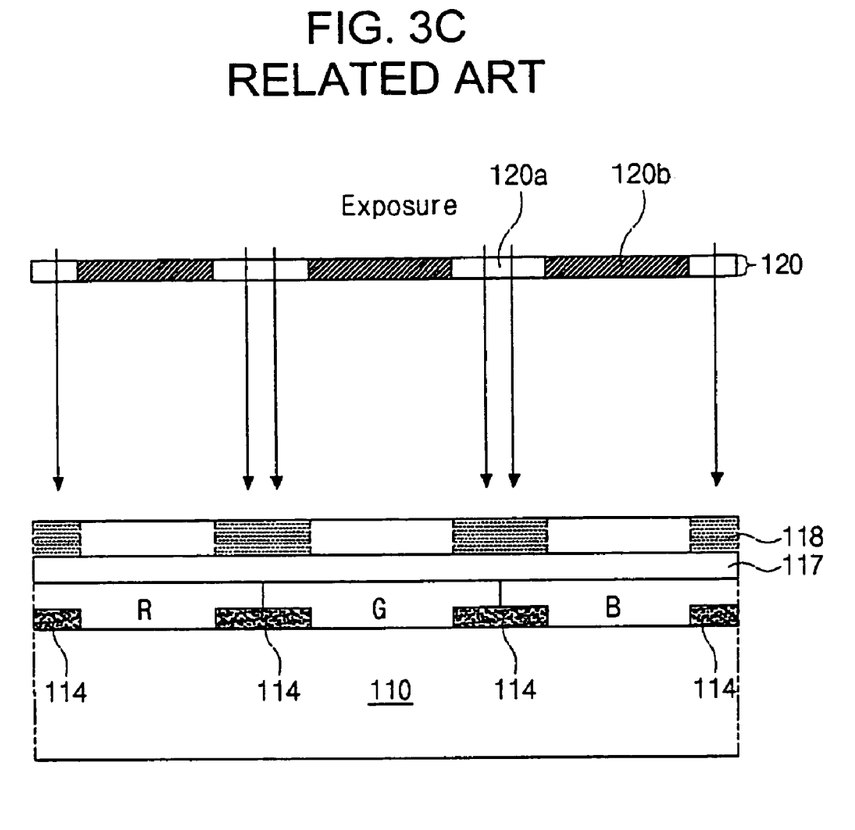

In FIG. 3C, a negative type photoresist (PR) layer 118 is formed on the overcoat layer 117, and a mask 120 is disposed over the negative-type PR layer 118. Then, the negative PR layer 118 is exposed through the mask 120 that includes a transmissive portion 120a corresponding to the black matrix 114 and a shielding portion 120b. Accordingly, a portion of the negative-type PR layer 118 is exposed through the transmissive portion 120a and remains as a pattern after a subsequent development step.

Figure 3D:
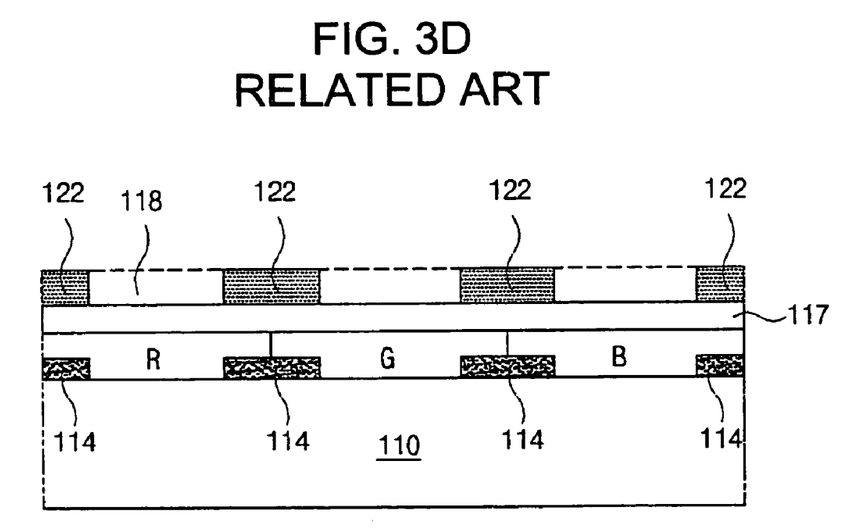

In FIG. 3D, a patterned spacer 122 is formed through a development step of the exposed negative-type PR layer 118. After developing the exposed negative-type PR layer 118, a curing step may be performed to stabilize a structure of the patterned spacer 122. Although not shown, the patterned spacer 122 overlapping the black matrix 114 corresponds to a metal line on an array substrate.

According to the related art, the patterned spacers are obtained using photolithographic processes after forming an overcoat layer in order to ensure uniformity. Then, a negative-type PR layer is formed on the overcoat layer using a coating step, and the negative-type PR-layer is treated using an exposure step, a development step, and a curing step in order to obtain the patterned spacers. Thus, the processes used to form the patterned spacers are complex, and since a negative-type PR is used, the patterned spacers may not be stable.

SUMMARY OF THE INVENTION

Accordingly, the present invention is directed to a liquid crystal display device having patterned spacers and a method of fabricating a liquid crystal display device having patterned spacers that substantially obviate one or more of the problems due to limitations and disadvantages of the related art.

An object of the present invention is to provide a liquid crystal display device having stable patterned spacers that has an elaborate and stable structure and a low fabricating cost.

Another object of the present invention is to provide a method of fabricating a liquid crystal display device having stable patterned spacers.

Another object of the present invention is to provide a method of fabricating a liquid crystal display device having low manufacturing costs.

Another object of the present invention is to provide patterned spacers that are formed as a single body with an overcoat layer during a forming process of the overcoat layer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a liquid crystal display device includes a substrate, a black matrix having a plurality of open portions on the substrate, a color filter layer on the black matrix, and a dielectric layer including first and second layers on the color filter layer, wherein the first layer has a uniform thickness and the second layer has a convex pattern, and the first and second layers include the same material.

In another aspect, a method of fabricating a color filter substrate for a liquid crystal display device includes forming a black matrix having a plurality of open portions on a substrate, forming a color filter layer on the black matrix, forming an overcoat layer on the color filter layer, forming a positive-type photoresist layer on the overcoat layer, forming a photoresist pattern corresponding to the black matrix using photolithographic processes of the photoresist layer, and etching the photoresist pattern and the overcoat layer to form a dielectric layer.

In another aspect, a liquid crystal display device includes first and second substrates, a thin film transistor, a common electrode, and a pixel electrode on the first substrate, a black matrix having a plurality of open portions on the second substrate, a color filter layer on the black matrix, a dielectric layer including first and second layers on the color filter layer, and a liquid crystal layer between the first and second substrates, wherein the first layer has a uniform thickness and the second layer has a convex pattern, and the first and second layers include the same material.

In another aspect, a method of fabricating a liquid crystal display device includes forming a thin film transistor, a common electrode, and a pixel electrode on a first substrate having a plurality of sub-pixel regions, forming a black matrix having a plurality of open portions corresponding to the sub-pixel region on a second substrate, forming a color filter layer on the black matrix, forming an overcoat layer on the color filter layer, forming a photoresist layer on the overcoat layer, forming a photoresist pattern corresponding to the black matrix using the photoresist layer, etching the photoresist pattern and the overcoat layer to form a dielectric layer, attaching the first and second substrates, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 4A:
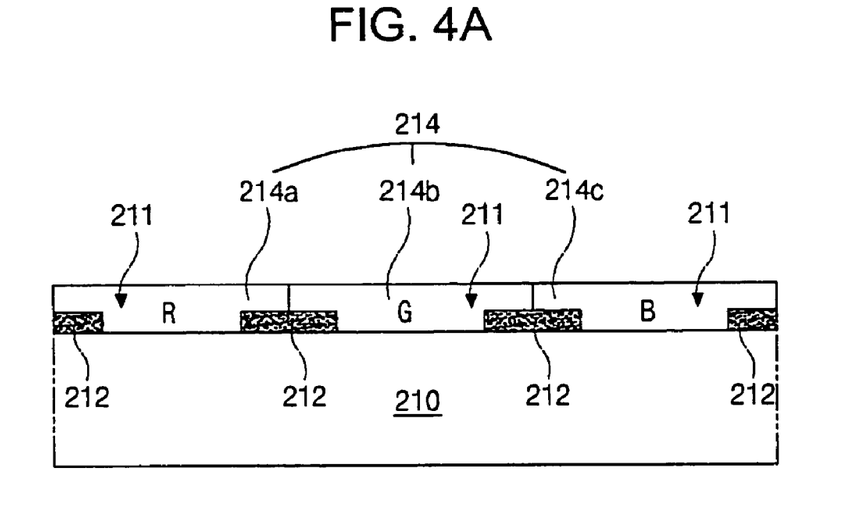
FIGS. 4A to 4E are cross sectional views of an exemplary process for fabricating a color filter substrate of a liquid crystal display device according to the present invention.

FIGS. 4A to 4E are cross sectional views of an exemplary process for fabricating a color filter substrate of a liquid crystal display device according to the present invention. In FIG. 4A, a black matrix 212 having a plurality of open portions 211 may be formed on a substrate 210, wherein the plurality of open portions 211 may be equally spaced apart from each other. The black matrix 212 may include opaque metallic material, such as chromium (Cr) and a black resin. In addition, a color filter layer 214, which includes red, green, and blue sub-color filters 214a, 214b, and 214c, may be formed on the black matrix 212, wherein each of the sub-color filters 214a, 214b, and 214c may correspond to one of the plurality of open portions 211. Although not shown, the black matrix 212 may be disposed along a periphery portions of each of the sub-color filters 214a, 214b, and 214c as a single body.

Figure 4B:
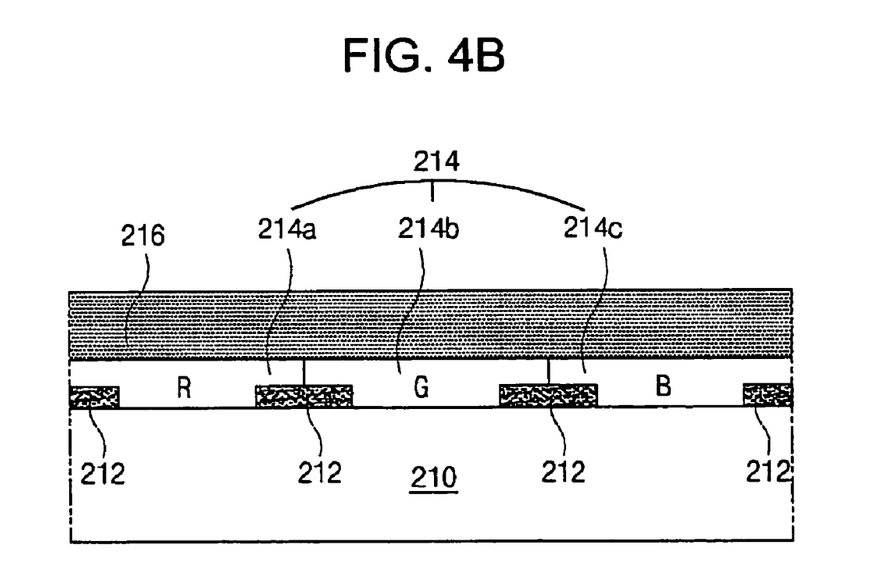

In FIG. 4B, an overcoat layer 216 may be formed on the color filter layer 214 in order to improve planarization properties of the color filter layer 214 and to prevent contamination of transparent electrodes due to carbonic materials of the black matrix 212 when the black matrix 212 is formed of a black resin. Since a top portion of the overcoat layer 216 may be used as a patterned spacer, a thickness of the overcoat layer 216 may be formed to be larger than a predetermined height of the patterned spacer. In other words, a first thickness of the overcoat layer 216 may be a sum of a second thickness sufficient to planarize the color filter layer and a third thickness corresponding to the predetermined height of the patterned spacer. For example, the overcoat layer 216 may be formed having the first thickness of about several micrometers (μm) to about several tens micrometers (μm), and may include material(s) having excellent planarization properties, such as acrylic material(s).

Figure 4C:
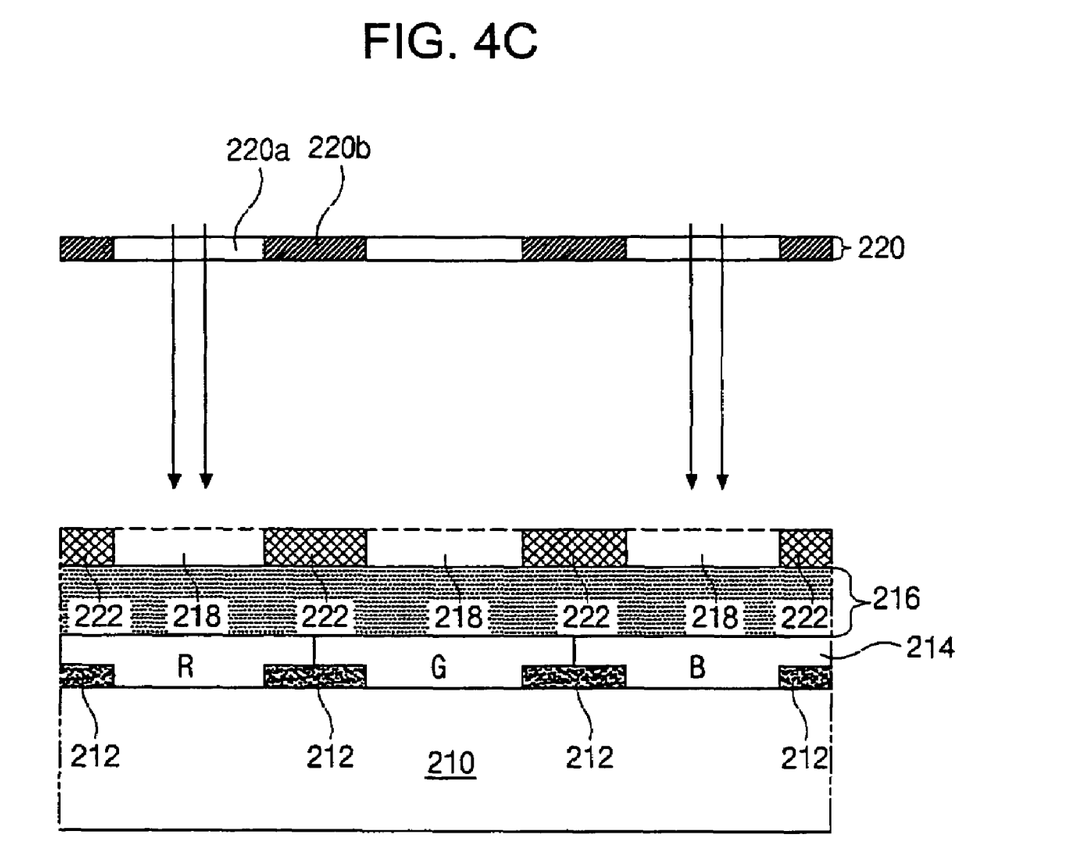

In FIG. 4C, after a PR layer 218, such as a positive-type PR material, is formed on the overcoat layer 216, a photo mask 220 having a transmissive portion 220a and a shielding portion 220b may be disposed over the PR layer 218. The transmissive portion 220a may correspond to the open portions 211 (in FIG. 4A) and the shielding portion 220b may correspond to the black matrix 212. Although not shown, the shielding portion 220b may have an area corresponding to a portion of a gate line and a data line on an array substrate. Then, a PR pattern 222 may be formed by exposing and developing the PR layer 218.

Figure 4D:
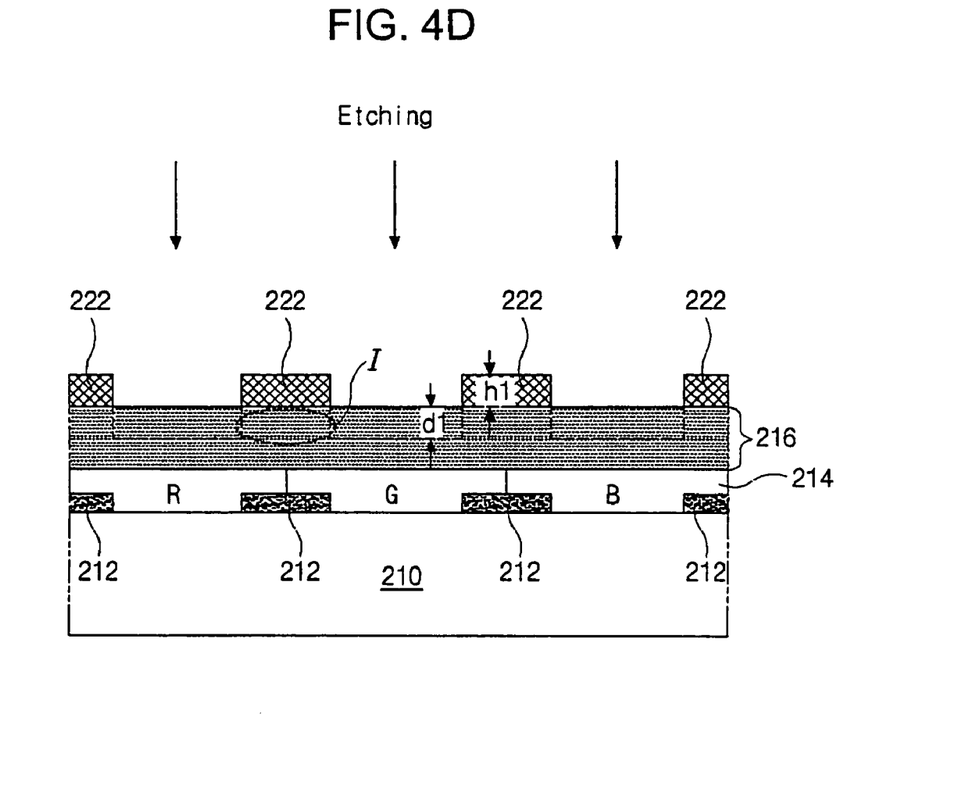

In FIG. 4D, the PR pattern 222 and the overcoat layer 216 may be etched by using the PR pattern 222 as an etching mask. Accordingly, the overcoat layer 216 may be etched until a height "h1" of the PR pattern 222 is obtained. Since the PR pattern 222 and the overcoat layer 216 may be etched using the same etching rate, the overcoat layer 216 may be etched with a depth "d1" corresponding to the height "h1" of the PR pattern 222. Thus, a portion "I" of the overcoat layer 216 under the PR pattern 222 is not etched, and the PR pattern 222 may be transcribed onto the overcoat layer 216 in a region "I." The PR pattern 222 may be cured for stabilization before etching of the PR pattern 222 and the overcoat layer 216. The PR pattern 222 and the overcoat layer 216 may be etched using a dry etching method. Although not shown, the substrate 210 having the PR pattern 222 and the overcoat layer 216 may be loaded into a vacuum chamber having reaction gases, wherein the PR pattern 222 and the overcoat layer 216 may be etched under a specific pressure by ionization of the reaction gases through plasma discharge.

Figure 4E:
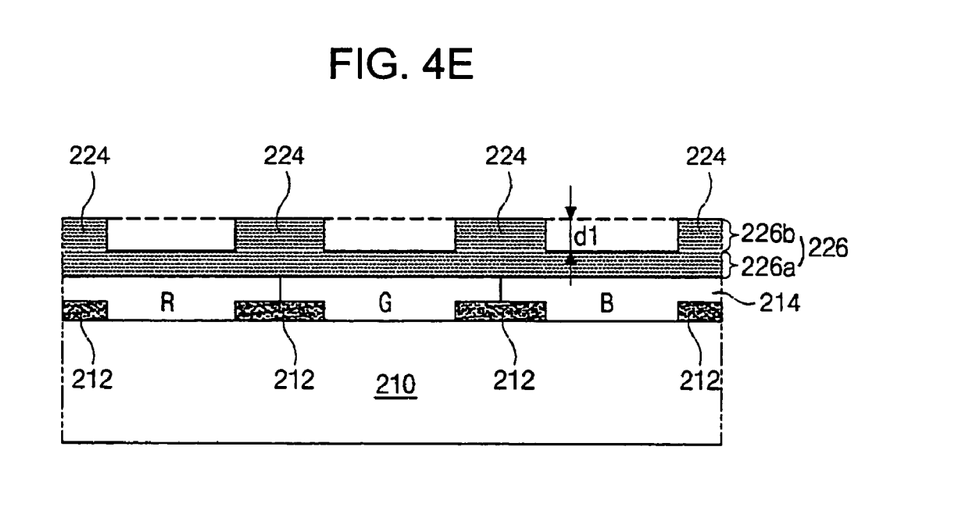

In FIG. 4E, after etching the PR pattern 222 and the overcoat layer 216, a resultant dielectric layer 226 having first and second layers 226a and 226b may be formed. The first layer 226a of the resultant dielectric layer 226 may have a uniform thickness and the second layer 226b of the resultant dielectric layer 226 may include convex patterns 224. Accordingly, the first layer 226a may function as an overcoat layer to planarize the color filter layer 214, and the second layer 226b may function as a patterned spacer to maintain a uniform cell gap. Thus, material costs may be reduced and fabricating processes for forming the patterned spacer may be simplified.

Figure 5:
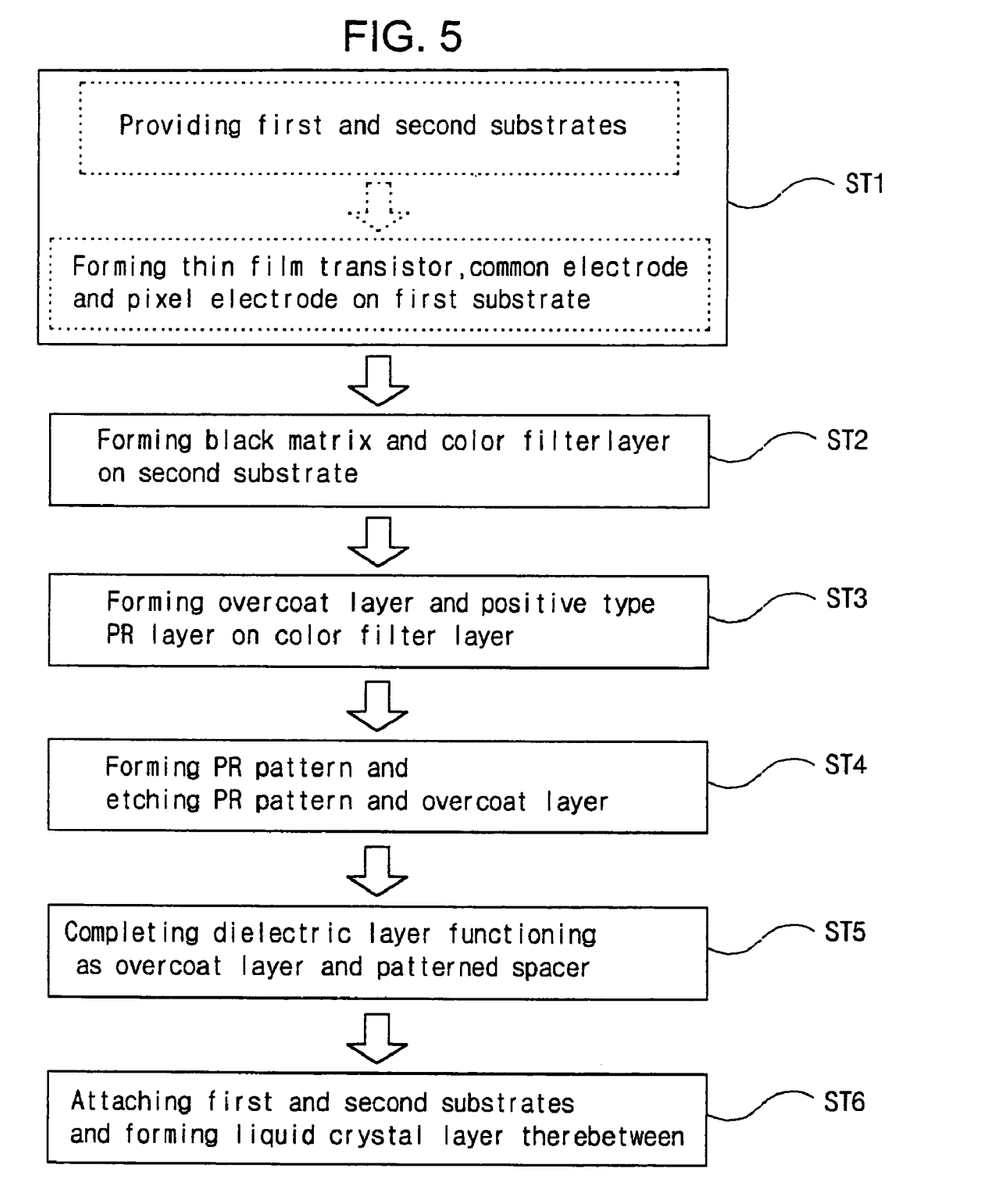
FIG. 5 is a flow chart of an exemplary method for fabricating an in-plane switching mode liquid crystal display device according to the present invention.

FIG. 5 is a flow chart of an exemplary method for fabricating an in-plane switching mode liquid crystal display device according to the present invention. In FIG. 5, a step ST1 may include providing first and second substrates, wherein gate and data lines may be formed on the first substrate. Accordingly, a sub-pixel region, which is a minimum unit capable of displaying images, may be defined by a cross of the gate and data lines. In addition, a thin film transistor (TFT) connected to the gate line and the data line may be formed within each sub-pixel region, and a plurality of pixel electrodes and a plurality of common electrodes may be formed within each sub-pixel region. The plurality of pixel electrodes may be connected to the TFT, and the common electrode may be alternately disposed with the pixel electrode, wherein the plurality of common electrodes and the gate line may be simultaneously formed with the same material. Moreover, a common line parallel to the gate line may be further formed to electrically interconnect the plurality of common electrodes.

In a step ST2, a black matrix, which may correspond to a periphery of the sub-pixel region, may be formed on the second substrate, and a color filter layer including red, green, and blue sub-color filters may be formed on the black matrix.

In a step ST3, an overcoat layer may be formed on the color filter layer, and a PR layer, such as a positive-type PR material, may be formed on the overcoat layer.

In a step ST4, a PR pattern may be formed using photolithographic processes, wherein the PR layer may be exposed and developed. The PR pattern may correspond to the black matrix. After forming the PR pattern, the overcoat layer may be etched using the PR pattern as an etch mask, wherein the PR pattern may also be etched. Accordingly, the overcoat layer and the PR pattern may be etched to have the same etching rate, wheren the overcoat layer is etched until the PR pattern is removed. Since a portion of the overcoat layer under the PR pattern is not etched and remains, the PR pattern may be transcribed onto the overcoat layer. The dry etching method may be used for the etching of the overcoat layer and the PR pattern.

In a step ST5, a resultant dielectric layer that may function as an overcoat layer (i.e., a planarization layer) and a patterned spacer may be formed. The resultant dielectric layer may include a first layer having a uniform thickness and a second layer having a convex pattern corresponding to the PR pattern. Since the first layer substantially functions as an overcoat layer, the first layer may have a thickness sufficient to planarize the color filter layer. Moreover, since the second layer may function as a patterned spacer, the convex pattern may have a thickness corresponding to a cell gap. The convex pattern may be formed to correspond to a gate line, a data line, and a common line.

In a step ST6, the first and second substrates may be attached together such that the common electrode and the pixel electrode of the first substrate may face the resultant dielectric layer of the second substrate. Then, a liquid crystal layer may be formed between the first and second substrates using an injection method or a dispensing method. Accordingly, a thickness of the liquid crystal layer may define the cell gap, wherein the second layer of the resultant dielectric layer may corresponds to and maintain the cell gap.

In FIG. 5, although the present invention may be applied to an IPS-mode LCD device, other mode LCD devices, such as twisted nematic (TN) mode LCD devices, may be used.

According to the present invention, since a resultant dielectric layer may function as an overcoat layer and a patterned spacer may be formed without an additional curing step, processing time and fabrication costs may be reduced. In addition, since a positive-type photoresist may be used, the patterned spacer may be formed having a stable elaborate configuration, thereby improving process efficiency. Furthermore, since an overcoat layer and a patterned spacer are formed as a single body, material costs may be reduced.

According to the present invention, formation of the patterned spacer may include forming a positive-type PR layer on an overcoat layer of a color filter substrate, forming a PR pattern corresponding to a black matrix by treating the positive-type PR layer using photolithographic processes, and etching the overcoat layer using the PR pattern as a mask, wherein an etching depth of the overcoat layer may be the same as a height of the PR pattern. After etching the overcoat layer, the overcoat layer under the PR pattern may be exposed, wherein the PR pattern may be transcribed into the overcoat layer to form a patterned spacer. Since the patterned spacer is formed as a single body with the overcoat layer, the patterned spacer may function as a planarization layer and a spacer.

It will be apparent to those skilled in the art that various modifications and variations can be made in the liquid crystal display device having patterned spacers and method of fabricating a liquid crystal display device having patterned spacers of the present invention without departing from the spirit or scope of the invention. Thus, it is intended that the present invention cover the modifications and variations of this invention provided they come within the scope of the appended claims and their equivalents.

What is claimed is:

1. A color filter substrate for a liquid crystal display device, comprising:
   a substrate;
   a black matrix having a plurality of open portions on the substrate;
   a color filter layer on the black matrix; and
   a dielectric layer including first and second layers on the color filter layer,
   wherein the first layer has a uniform thickness through an entire surface of the substrate and the second layer has a convex pattern, and the first and second layers include the same material,
   wherein a photoresist pattern corresponding to the convex pattern is formed on a dielectric material layer, and the dielectric material layer is etched until the photoresist pattern is removed such that the second layer from the dielectric material layer under the photoresist pattern has the same thickness as the photoresist pattern.

2. The substrate according to claim 1, wherein the color filter layer includes red, green, and blue sub-color filters.

3. The substrate according to claim 2, wherein one of the plurality of sub-color filters corresponds to one of the plurality of open portions.

4. The substrate according to claim 1, wherein the convex pattern corresponds to the black matrix.

5. The substrate according to claim 1, wherein the first layer planarizes the color filter layer and the second layer maintains a cell gap of the liquid crystal display device.

6. A liquid crystal display device, comprising:
   first and second substrates;
   a thin film transistor, a common electrode, and a pixel electrode on the first substrate;
   a black matrix having a plurality of open portions on the second substrate;
   a color filter layer on the black matrix;
   a dielectric layer including first and second layers on the color filter layer; and
   a liquid crystal layer between the first and second substrates,
   wherein the first layer has a uniform thickness through an entire surface of the second substrate and the second layer has a convex pattern, and the first and second layers include the same materials,
   wherein a photoresist pattern corresponding to the convex pattern is formed on a dielectric material layer, and the dielectric material layer is etched until the photoresist pattern is removed such that the second layer from the dielectric material layer under the photoresist pattern has the same thickness as the photoresist pattern.

7. The device according to claim 6, wherein the first layer planarizes the color filter layer and the second layer maintains a cell gap defined by a thickness of the liquid crystal layer.

* * * * *